United States Patent [19]

Kelsey

[11] Patent Number: 5,242,066
[45] Date of Patent: Sep. 7, 1993

[54] PLASTIC BOTTLES AND SIMILAR CONTAINERS HAVING INTERNAL SPIDERS

[75] Inventor: Stephen F. Kelsey, London, England
[73] Assignee: Whitbread & Company plc, England
[21] Appl. No.: 684,947
[22] PCT Filed: Nov. 16, 1989
[86] PCT No.: PCT/GB89/01362
§ 371 Date: Jul. 8, 1991
§ 102(e) Date: Jul. 8, 1991
[87] PCT Pub. No.: WO90/05674
PCT Pub. Date: May 31, 1990

[30] Foreign Application Priority Data

Nov. 16, 1988 [GB] United Kingdom ............... 8826824
Apr. 19, 1989 [GB] United Kingdom ............... 8908886

[51] Int. Cl.⁵ .................. B65D 1/04; B65D 23/00; B29C 49/00; B29C 49/12
[52] U.S. Cl. ........................................ 215/1 C; 215/6
[58] Field of Search .............. 215/1 C, 6; 220/555; 264/523; 65/261

[56] References Cited

U.S. PATENT DOCUMENTS

| | | | |
|---|---|---|---|
| 2,661,871 | 12/1953 | Huenergardt | 222/129 |
| 2,753,990 | 7/1956 | Chalfin et al. | 215/6 X |
| 2,951,264 | 9/1960 | Bailey | 206/221 X |
| 3,474,927 | 10/1969 | Bowles | 215/6 X |
| 3,743,467 | 7/1973 | Lopez | 215/1 C X |
| 4,026,984 | 5/1977 | Seefluth | 264/532 |
| 4,065,536 | 12/1977 | Lucas | 215/6 X |
| 4,101,041 | 7/1978 | Mauro, Jr. et al. | 215/6 |
| 4,217,328 | 8/1980 | Cambio, Jr. | 264/524 X |
| 4,261,948 | 4/1981 | Krishnakumar et al. | 215/1 C X |
| 4,277,000 | 7/1981 | Jarsha | 215/6 X |
| 4,279,349 | 7/1981 | Aigner | 215/6 |

FOREIGN PATENT DOCUMENTS

| | | | |
|---|---|---|---|
| 208516 | 12/1955 | Australia | 215/1 C |
| 369707 | 1/1983 | Austria . | |
| 733362 | 5/1966 | Canada | 215/6 |
| 1073159 | 9/1954 | France | 215/6 |
| 2490595 | 3/1982 | France . | |
| 8400867 | 10/1985 | Netherlands | 215/6 |
| 940326 | 10/1963 | United Kingdom | 215/6 |
| 2067131 | 7/1981 | United Kingdom . | |
| 2133375 | 7/1984 | United Kingdom | 220/555 |

*Primary Examiner*—Sue A. Weaver
*Attorney, Agent, or Firm*—Sughrue, Mion, Zinn, Macpeak & Seas

[57] ABSTRACT

A blow-molded plastics bottle having a neck, a side wall and a base, includes an internal spider attached to the side wall of the bottle. The spider and the side wall are formed from biaxially-oriented plastics such that the strength of the bottle is increased and such that the bottle resists the pressures caused by the contents thereof.

8 Claims, 6 Drawing Sheets

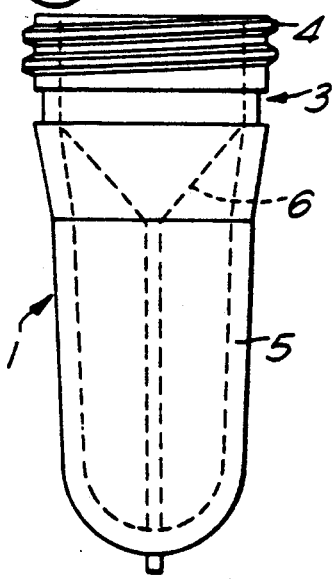
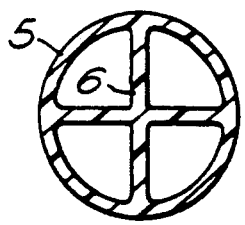
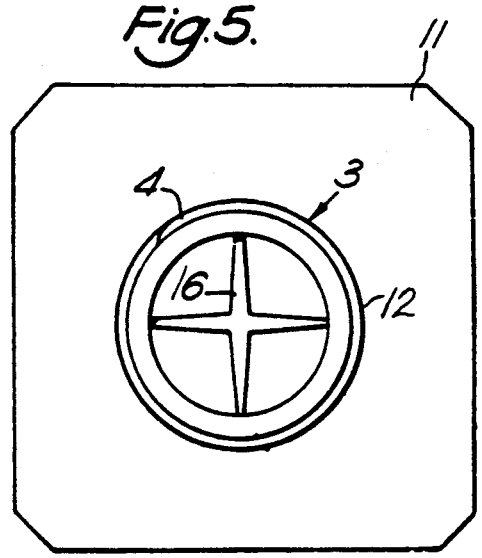
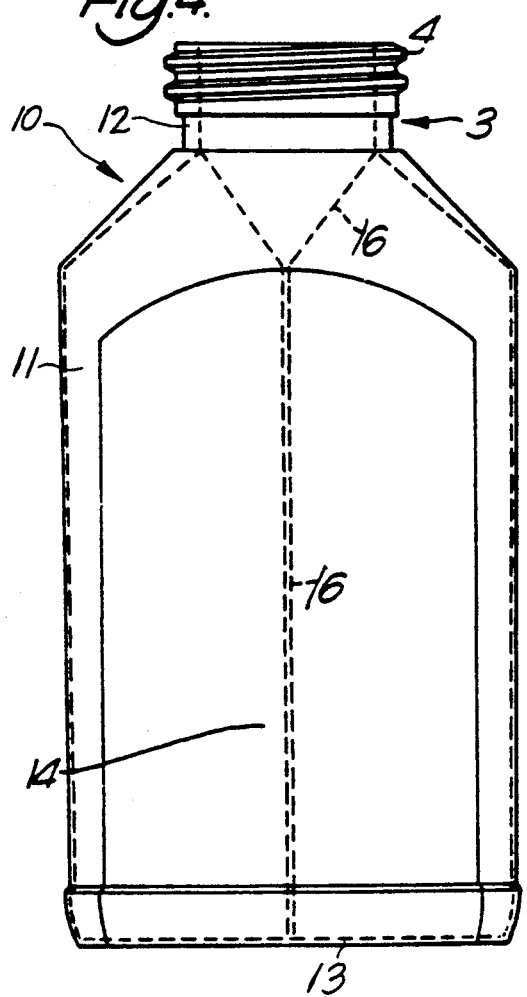
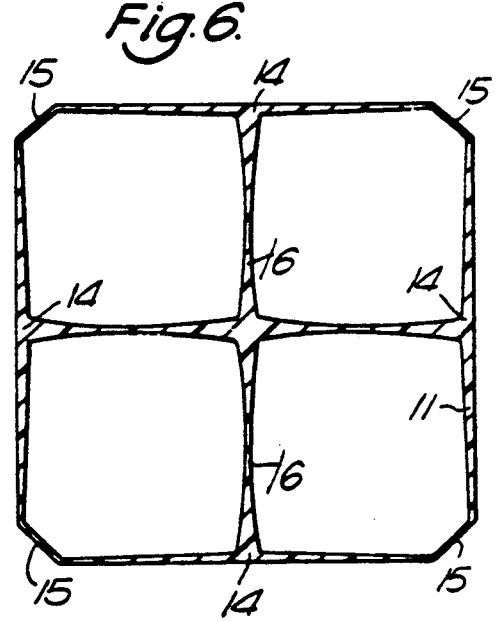

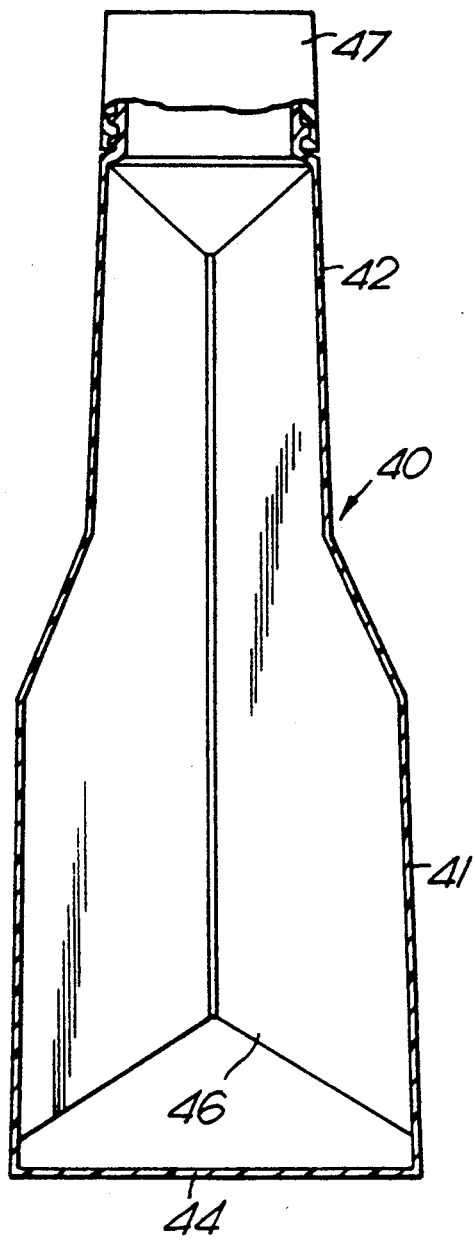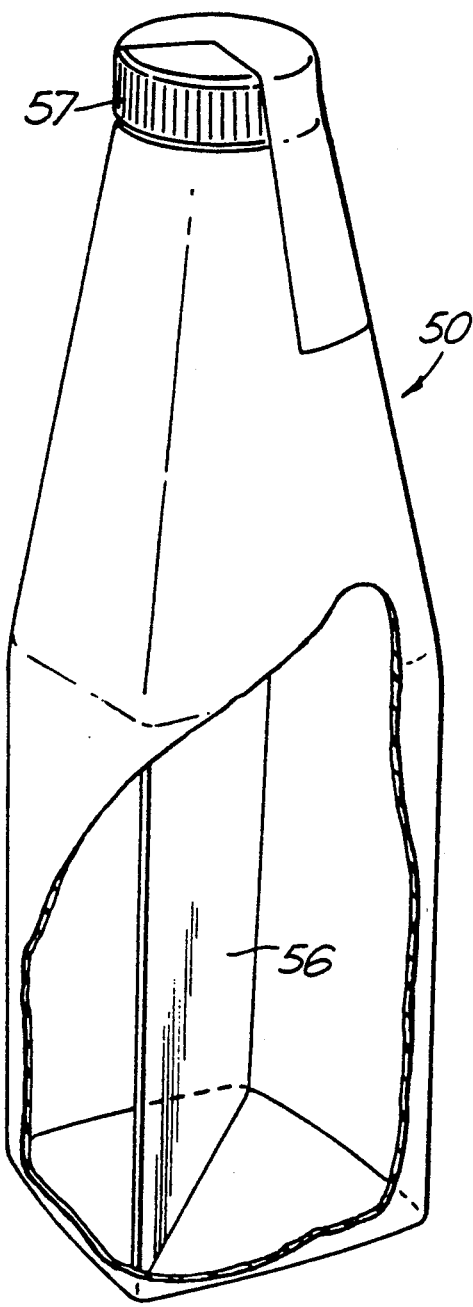

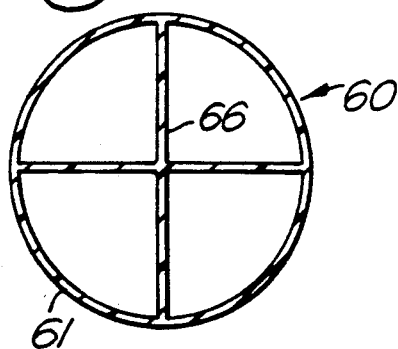
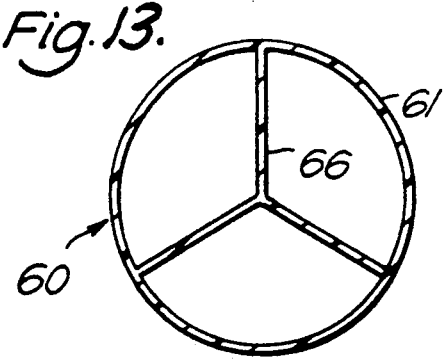
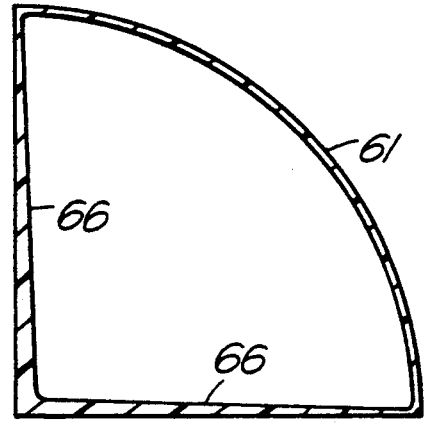
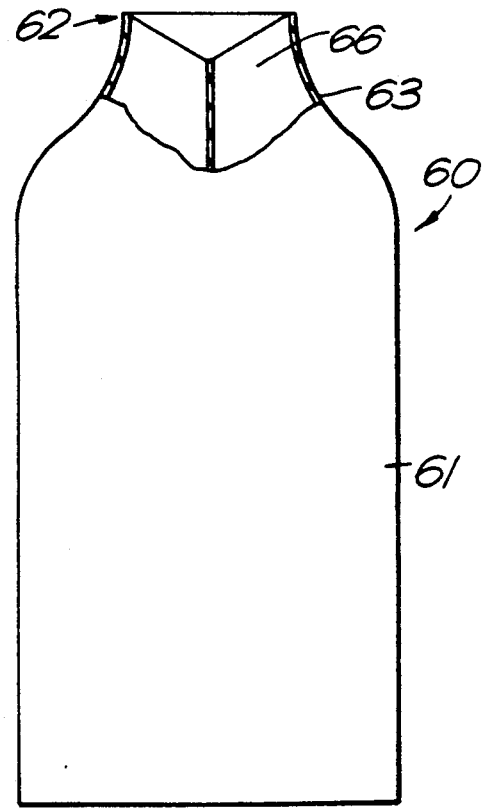
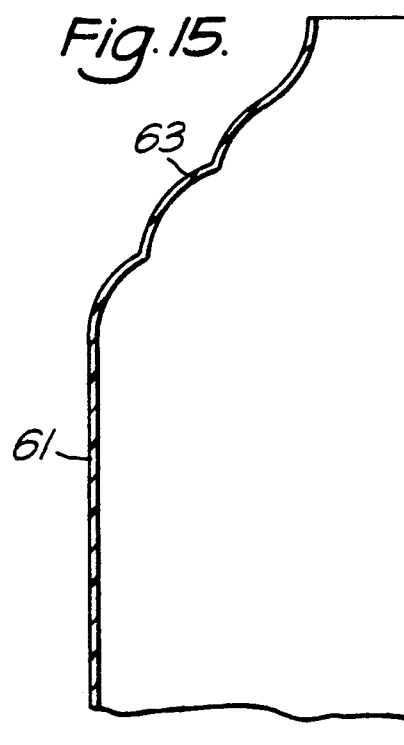

PLASTIC BOTTLES AND SIMILAR CONTAINERS HAVING INTERNAL SPIDERS

BACKGROUND OF THE INVENTION

This invention relates to plastics bottles and similar containers and particularly those intended to contain their contents under pressure. Traditionally returnable glass bottles have been used to contain pressurised beverages and other liquids. It is common for such returnable glass bottles to make up a proportion as high as 90% of the total load to be transported. By using non-returnable glass bottles the weight of the bottles can be reduced to about 55% of the total load but by using modern plastics materials such as blow moulded PET it is possible to reduce the weight of the containers to a level as low as about 11% of the total load. This leads to considerable reductions in transport and distribution costs.

Large bottles even when not containing carbonated, or other pressurised beverages must still have side walls of considerable strength to contain the weight of their contents. When bottles and similar containers have to resist pressurised contents such as carbonated beverages they have to withstand considerable internal pressures. As an example of this a beer containing 2.5 volumes of carbon dioxide exerts a pressure on the side wall of the container of approximately 1½ bar at for example 60° F. (16° C.) and this can increase to a pressure as high as 3 bar at 90° F. (32° C.). The ideal shape of a container to resist such internal pressures is for them to be substantially spherical. However, this shape is not preferred for packaging purposes and so, conventionally, the shape is rationalised by the bottles or similar containers having a generally cylindrical shape with domed ends. By forming plastics bottles or similar containers in this way they are shaped to resist the load exerted by the contents whether this results from the mere weight of the contents or whether this results from the pressurised nature of the contents.

Blow moulded plastics bottles are also known which include an internal division which divides the bottle into separate compartments. Examples of such bottles are described in U.S. Pat. No. A-4,070,140, U.S. Pat. No. -4,217,328 and FR-A-1,258,792.

FR-A-1,258,792 describes a blow moulded plastics bottle having a neck formed to receive a bottle closure, a side wall and a base, and including an internal spider attached to the side wall and extending across the inside of the bottle.

SUMMARY OF THE INVENTION

According to this invention such a bottle or similar container is characterised in that the material in the side wall and spider, at least, of the bottle or other container is bi-axially oriented so that the spider resists tension and acts as an internal reinforcing structure.

The plastics bottle or similar container is preferably formed by initially injection moulding a preform and then blowing the injection moulded preform into a mould cavity thereby bi-axially orienting the side wall and spider, at least, of the bottle.

Usually the bottle or similar container is formed by a stretch-blow moulding technique in which the injection moulded preform is first stretched axially into substantially its final axial length before being blown to its final transverse dimension. This axial stretching may take place by the top of the axial preform which is to form the neck of the bottle being held in a mould and, at the same time, the base of the preform being pushed away from the neck by more than one push rod which enters the preform through the neck and engages its base to push it away from the neck to stretch axially the preform. There may be half as many push rods as there are compartments formed within the bottle by the spider but preferably there are an equal number of push rods and divided compartments inside the bottle. Thus, where the spider is cruciform in cross section four separate push rods are preferably included which engage the base of the preform in each compartment.

Another way of axially stretching the preform is, whilst the neck of the preform is being held in a mould, to engage the outside of the base of the preform and pull this downwards away from the neck. One way of achieving this is to provide a suction cup which fits over the base of the preform and then move the suction cup away from the neck moulding to stretch axially the preform. Alternatively, the preform may be formed with an external tab and, in this case, a gripper is provided to grip the external tab and axially stretch the preform whilst its neck is held.

A further way in which the preform can be axially stretched is for the mould in which the neck of the preform or parison is formed to have a length substantially equal to the final axial length of the preform but to have a width which is considerably less than the final width of the bottle. Then, the preform or parison is subjected to an initial blowing step in which it is blown into this first, narrow mould, during which the preform is axially stretched to substantially its final length. Subsequently, the preform is demoulded and placed into its final mould where it is blown to its final width.

Preferably the preform is blow moulded immediately after it is injection moulded and whilst it is still hot. Typically the hot preform is subjected to an initial thermal conditioning step before blowing which ensures that the entire preform is at a constant, elevated temperature typically in a range of 85° to 100° C. Preferably, as part of this thermal conditioning step more than one thermal conditioning rod is inserted through the neck into the inside of the preform. Again there may be half the number of thermal conditioning rods as there are divided compartments inside the preform and bottle or similar container but preferably there is an equal number of thermal conditioning rods as there are divided compartments inside the preform and bottle or similar container. The thermal conditioning rods are each formed as the thermal conditioning rods used in conventional blow moulding equipment and thus typically formed as heat pipes.

The internal spider may extend substantially the whole length of the bottle or similar container from its neck to its base and, in this case, is preferably absent from the neck of the bottle or similar container to enable the bottle or similar container to be filled by conventional filling machinery. Alternatively the internal spider only extends over part of the length of the bottle or other container. Thus the spider may only be present towards the base of the bottle when it is used to buttress and support the base of the bottle or similar container. Instead the spider may be present only towards the top of the bottle or similar container when it is only necessary to buttress this region of it. When the spider only extends over part of the length of the bottle or similar container communication between the various chambers formed inside the bottle or similar container is improved.

The neck of the bottle or similar container may be formed to receive a re-closeable bottle closure such as, for example, a screw cap or twist off closure or alternatively the neck of the bottle or similar container may be formed to receive a one-use-only bottle closure such as a crown cap or ring pull type of closure. The one-use-only type of closure may also be formed by a tear strip which is heat or adhesively sealed to the neck of the bottle or similar container. Typically the form of the bottle closure is conventional in construction to enable the bottles or similar containers to be used with conventional filling and capping machinery.

The internal spider preferably has the form of planar webs extending generally radially across the inside of the bottle and joining together at the central longitudinal axis of the bottle or similar container. In this case the spider typically has three, four, six or eight equiangularly spaced radial webs. Another form for the spider is for it to have a central substantially planar web which divides into two or more webs before being joined to the side walls of the bottle or similar container. Thus, in cross section the spider has the form of two back-to-back Y's.

Preferably the thicknesses of the elements (i.e., the webs) of the spider are tapered, and are greatest adjacent the longitudinal axis of the bottle or similar container. The elements of the spider may also be thinnest at a central region of each element and increase in thickness again before they meet and join the side wall of the bottle or similar container. This configuration which is encouraged by shaping of the preform provides a controlled expansion of the bottle during blowing and a controlled bi-axial orientation of the material in the elements of the spider.

The bottle or similar container may be formed of PET (polyethylene terephthalate, polypropylene, OPVC (oriented polyvinylchloride), polycarbonate, nylon or multilayers including PET, nylon, and ethylene-vinyl alcohol co-polymer. The choice of material for the bottle or similar container is largely governed by the contents of it. Where these are sensitive to the ingress of oxygen it is naturally important to select materials which have a low oxygen permeability and, for this, multilayers are preferred.

The internal spider formed inside bottles and other containers in accordance with this invention is bi-axially oriented and so provides a member which resists tension and so resists outward deformation of the side wall. This firstly reinforces the bottles or similar containers and so helps them to resist an internal pressure resulting from either the weight of the contents or the pressurised nature of the contents. Secondly, and perhaps more importantly it enables plastics bottles and similar containers to be formed with shapes other than cylindrical with domed ends and yet still to have sufficient strength to resist the internal pressures generated by the filling. Where the internal spider extends down to and is connected to the base of the bottle or similar containers this can be made substantially flat or slightly concave and yet still resist an internal pressure resulting from its pressurised contents. By making a bottle or similar container in this form it is stable. The internal spider buttresses the side wall of the bottle and so enables the bottle or similar container to be, for example, polygonal in shape, in this case, preferably the spider is connected to the middle of panels in the side wall of the bottle or similar container or to each longitudinally extending corner of the bottle or similar container. In this way it is possible to have bottles and similar containers with a substantially square cross-section and bottles and similar containers which are substantially rectangular in form and so which provide the maximum possible packing density for transport or subsequent storage either by a distributor or by the end user. Such a bottle shape increases the volume efficiency during transport and storage by over 20%. Alternatively the side wall may have a re-entrant form.

BRIEF DESCRIPTION OF THE DRAWINGS

Particular examples of plastics bottles and similar containers in accordance with this invention will now be described with reference to the accompanying drawings, in which:

FIG. 2 is a side elevation of a preform;

FIG. 3 is a cross-section through the preform;

FIG. 4 is a side elevation of a first example of a finished bottle;

FIG. 5 is a plan of the first example of a finished bottle;

FIG. 6 is a cross-section through the first example of a finished bottle;

FIG. 9 is a longitudinal section through a fourth example;

FIG. 10 is a partially cut-away perspective view of a fifth example;

FIG. 11 is a cross-section through a sixth example;

FIG. 12 is a cross-section through a quadrant of the sixth example drawn to a larger scale;

FIG. 13 is a cross-section through a modification of the sixth example;

FIG. 14 is a longitudinal section through the sixth example;

FIGS. 15 and 16 are radial sections showing alternative side profiles for the top of the sixth example; and, FIGS. 17, 18 and 19 are a cross-sections through three further examples of blow moulded bottles.

DETAILED DESCRIPTION OF THE PREFERRED EMBODIMENTS

Figure 1:
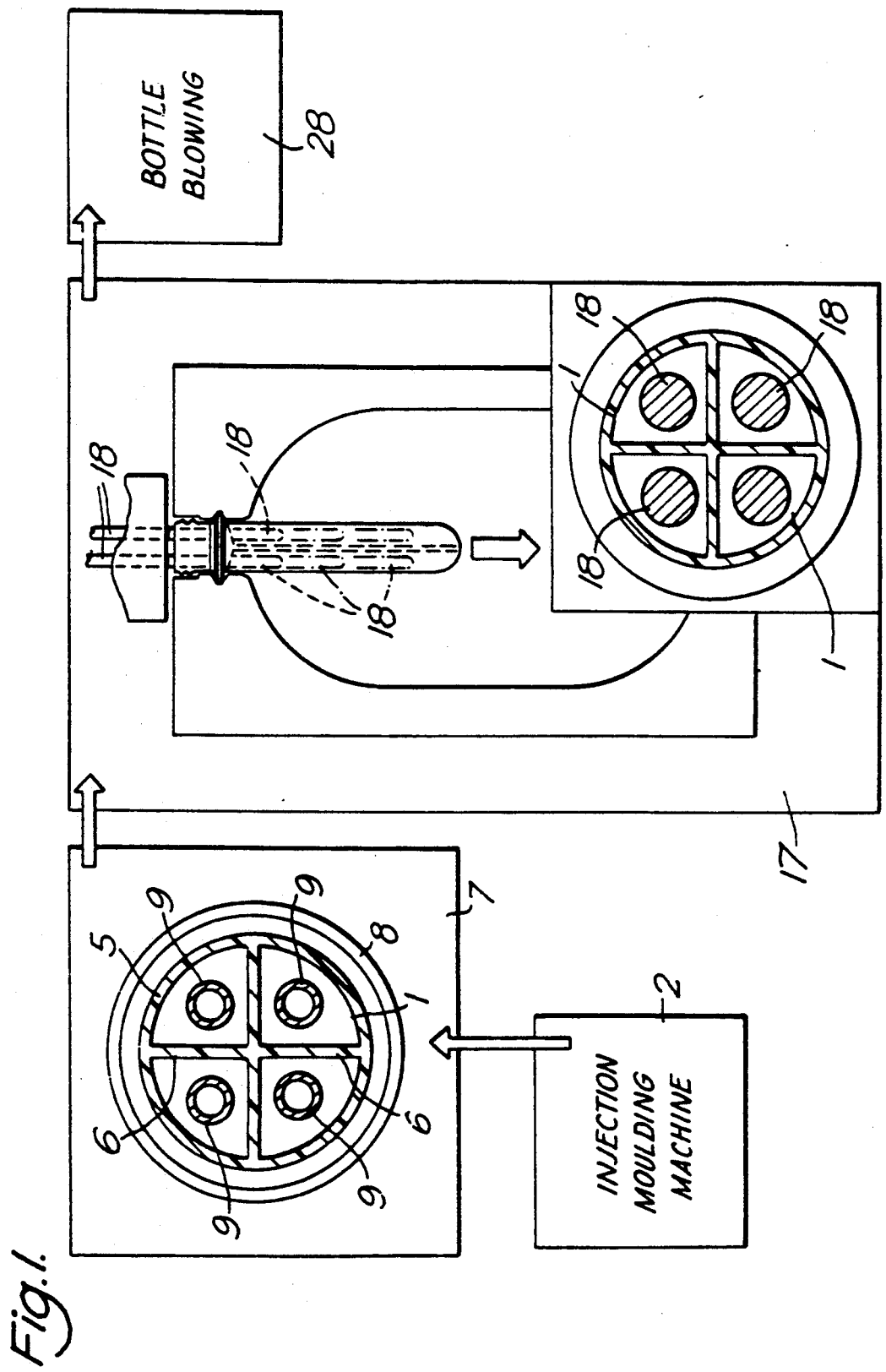
FIG. 1 is a diagram illustrating a method of making a bottle.

An injection moulded preform 1 shown in FIGS. 2 and 3 is injection moulded in an entirely conventional injection moulding machine 2. The preform 1 comprises a neck 3 with a moulded male screw thread 4 arranged to receive a screw-on closure (not shown), and a body forming portion 5. An internal spider 6 having a cruciform cross-section is located inside the body forming portion 5. As soon as the preform 1 has cooled sufficiently to be self supporting it is transferred to a conditioning station 7. The conditioning station 7 comprises an outer heated conditioning pot 8 and four conditioning rods 9 consisting of heat pipes which enter through the neck 3 of the injection moulded preform 1 into internal cavities formed between the elements of the cruciform spider 6 and side wall 5 of the preform. The preform 1 is held at the conditioning station 7 until it has a completely uniform temperature of typically 90° C. When the plastics material is injection moulded it typically has a temperature of the order of hundreds of ° C.

and thus, at the conditioning station 7 the preform is cooled until it is all at a constant elevated temperature. The preform is then moved to an axial stretching station 17 in which four stretch rods 18 enter through the neck 3 of the preform 1 and move downwards axially to stretch the preform 1 until it has a length corresponding to that of the finished bottle. At the completion of the axial stretching of the preform 1 the stretch rods 18 are removed and then the axially stretched preform is moved to a blowing station 28 in which it is blown into a mould to provide a bottle of required shape.

The first example of a bottle is generally rectangular in shape and square in cross-section and is shown in FIGS. 4, 5 and 6. It comprises a bottle 10 with a body portion 11, neck 12 of circular cross-section, and base 13. A side wall of the body of the bottle consists of flat panels 14 connected by chamfered corner portions 15. A cruciform spider 16 is joined to the middle of each flat panel 14. The wall thickness of the side wall in the panels 14 decreases away from their junctions with the spider 16 with the chamfered regions 15 having the smallest thickness. The wall thickness of the blades of the spider 16 is narrowest in the centre of each blade and greatest at the joint with the panels 14 and along the central longitudinal axis of the bottle 10.

During the stretch and blow moulding performed on the preform 1 the material forming the side wall of the bottle 5, the spider 6, and to some extent its base, is bi-axially oriented so, thereby increasing tensile strength considerably and reducing its permeability. Thus the material in the side wall 11, spider 16 and to some extent the base 13, is bi-axially oriented. In this example the preform 1 is injection moulded from PET to provide a clear transparent bottle.

The remaining examples of bottles are all manufactured by a similar technique.

Figure 7A:
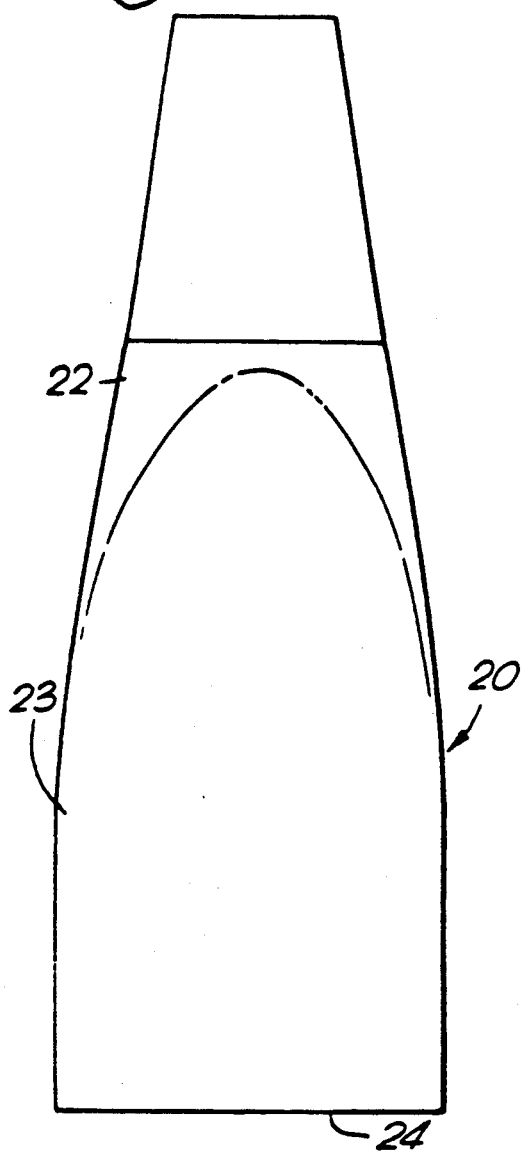
FIGS. 7A and B are a side elevation and cross-section, respectively, through a second example.
Figure 7B:
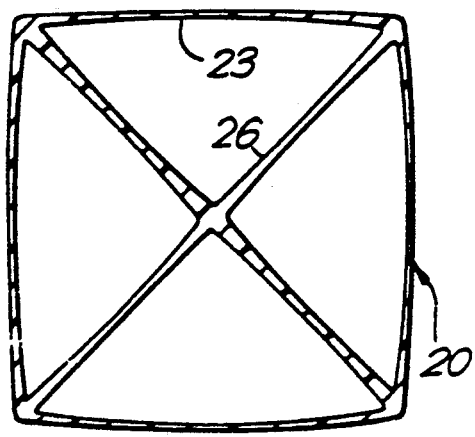

The second example of a bottle shown in FIG. 7 is generally square in cross-section and comprises a bottle 20 with a neck 22 of circular cross-section, a side wall 23 which in the body of the bottle is substantially square in cross-section and a base 24. An internal cruciform sectioned spider 26 extends across the diagonals of the bottle 20.

Figure 8A:
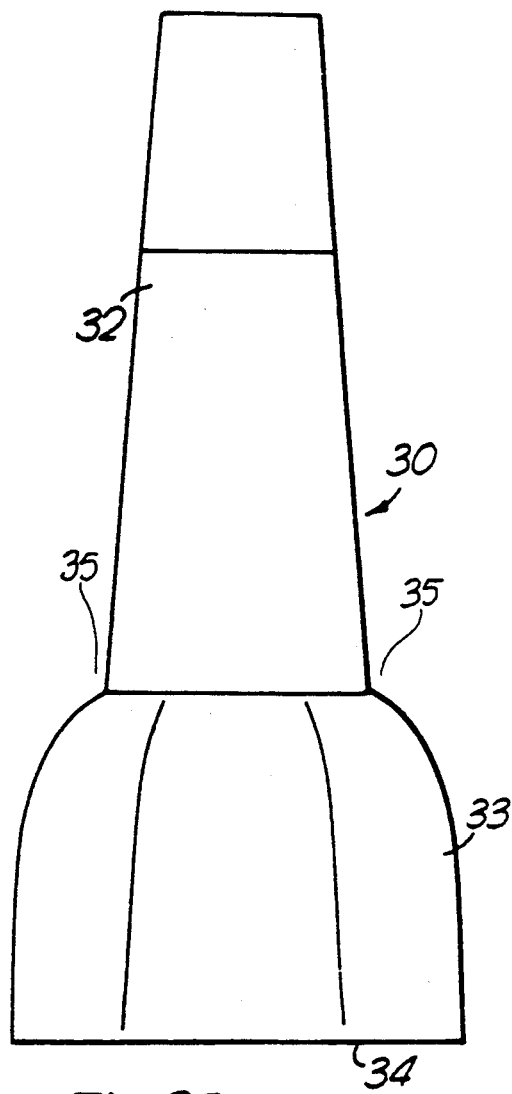
FIGS. 8A and B are a side elevation and cross-section, respectively, through a third example.
Figure 8B:
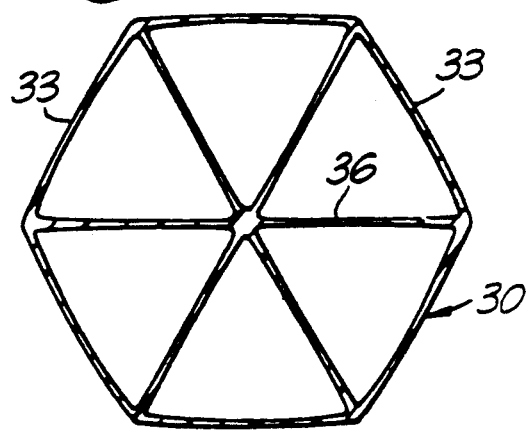

A third example of a bottle is shown in FIG. 8 and comprises a bottle 30 with a cylindrical neck 32 which leads via a re-entrant portion 35 to a hexagonal body 33 above base 34. A six bladed internal spider 36 extends to the vertices of the hexagonal body 33 and is formed inside the bottle 30.

The fourth example 40 shown in FIG. 9 again has a substantially square body portion 41 and a generally cylindrical neck 42. An internal spider 46 is included which is cruciform in section and absent from the top of the cylindrical neck region 42 and from adjacent a base 44 of the bottle. The cylindrical neck portion 42 is formed to receive a conventional screw top 47.

A fifth example which is somewhat similar to the second example is shown in FIG. 10 which is cut away to illustrate the internal structure of the bottle 50 to show a spider 56 and a screw cap 57.

Figure 16:
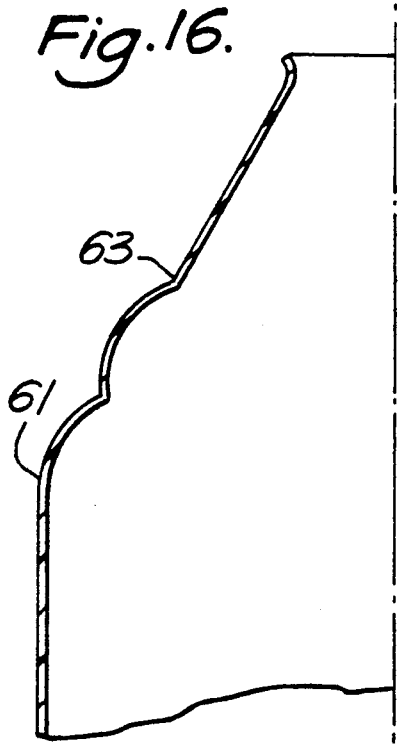

A sixth example of bottle 60 in accordance with this invention is shown in FIG. 11 to 14. The bottle 60 has a generally cylindrical body portion 61 and neck 62 with a re-entrant portion 63 joining the body 61 to the neck 62. The bottle 60 includes an internal spider 66 which is absent from the top of the neck as shown in FIG. 14 and which has a three or four blades as shown in FIGS. 11 and 13. FIGS. 15 and 16 show alternative forms for the re-entrant portion 63 joining the body 61 to the neck 62. The portion of the neck 62 to receive a bottle closure has been omitted from FIGS. 14, 15 and 16 for clarity.

FIG. 12 illustrates the thickness profile of a quadrant of the bottle 60 illustrating that the thickness of the webs forming the internal spider 66 decreases from their centre to their outside and that, their thickness adjacent their centre is typically four times the side wall thickness of the bottle whilst their thickness towards the side wall is approximately 2.6 times the side wall thickness.

Figure 17:
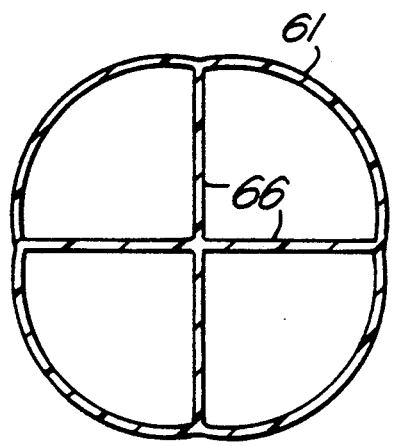
Figure 18:
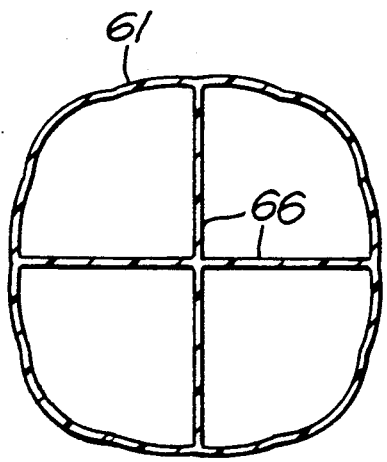
Figure 19:
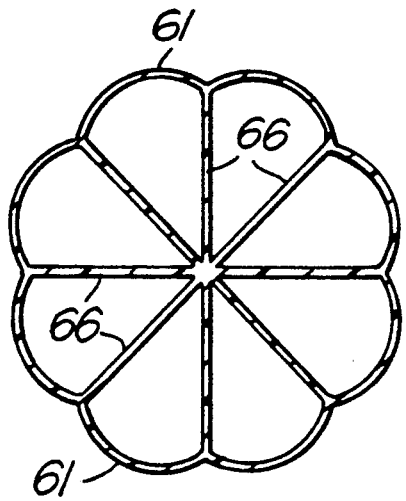

FIGS. 17, 18 and 19 show alternate forms for blown bottles in accordance with the sixth example of this invention and illustrate in FIG. 17 how the side wall 61 typically bows out over the regions where it is not connected to the internal spider 66. This effect can be exaggerated by introducing profiling into the side wall to produce blown bottles which are substantially square in cross-section as shown in FIG. 18 or can be used to provide a decorative feature and provide a vertically fluted bottle as shown in FIG. 19 by using an eight bladed spider 66.

I claim:

1. A blow moulded plastics bottle (10) having a neck (12) formed to receive a bottle closure, a side wall (11) and a base (13), and including an internal spider (16) attached to the side wall (11), said spider extending approximately from the neck to the base and across the inside of the bottle (10), characterised in that the material in the side wall (11) and the spider (16) is bi-axially oriented so that the spider (16) resists tension and acts as an internal reinforcing structure to prevent outward deformation of the side walls.

2. A plastics bottle according to claim 1, prepared by a process comprising the steps of:
   injection molding a preform; and blowing the injection moulded preform into a mould cavity thereby bi-axially orienting at least the side wall (11) and the spider (16) of the bottle (10).

3. A plastics bottle according to claim 2, in which the bottle is further prepared by a stretch-blow moulding technique comprising axially stretching the injection moulded preform into substantially its final axial length before the preform is blown to its final transverse dimension.

4. A plastics bottle according to any one of claim 1 to 3, in which the internal spider (16) extends substantially the whole length of the bottle (10) from its neck (12) to its base (13) and, in which the spider (16) is absent from the neck (12).

5. A plastics bottle according to any one of claims 1 to 3, in which the internal spider (16) only extends over part of the length of the bottle (10).

6. A plastics bottle according to any one of claims 1 to 3, in which the internal spider (16) has the form of planar webs extending generally radially across the inside of the bottle (10) and joining together at the central longitudinal axis of the bottle (10).

7. A plastics bottle according to any one of claims 1 to 3, in which the thicknesses of elements of the spider are tapered and are greatest adjacent the longitudinal axis of the bottle.

8. A plastics bottle according to any one of claims 1 to 3, formed of a plastic selected from the group consisting of PET (polyethylene.terephthalate), polypropylene, OPVC (oriented polyvinylchloride), polycarbonate, nylon, and multilayers including PET, nylon, and ethylene-vinyl alcohol co-polymer.

* * * * *